Feb. 8, 1938. M. F. WITTENBERG 2,107,356
DISPLAY DEVICE FOR WEARING APPAREL
Filed March 12, 1934 4 Sheets-Sheet 1

INVENTOR
Mervyn F. Wittenberg
By Russell B. Griffith
his Attorney

Feb. 8, 1938.  M. F. WITTENBERG  2,107,356
DISPLAY DEVICE FOR WEARING APPAREL
Filed March 12, 1934  4 Sheets-Sheet 2
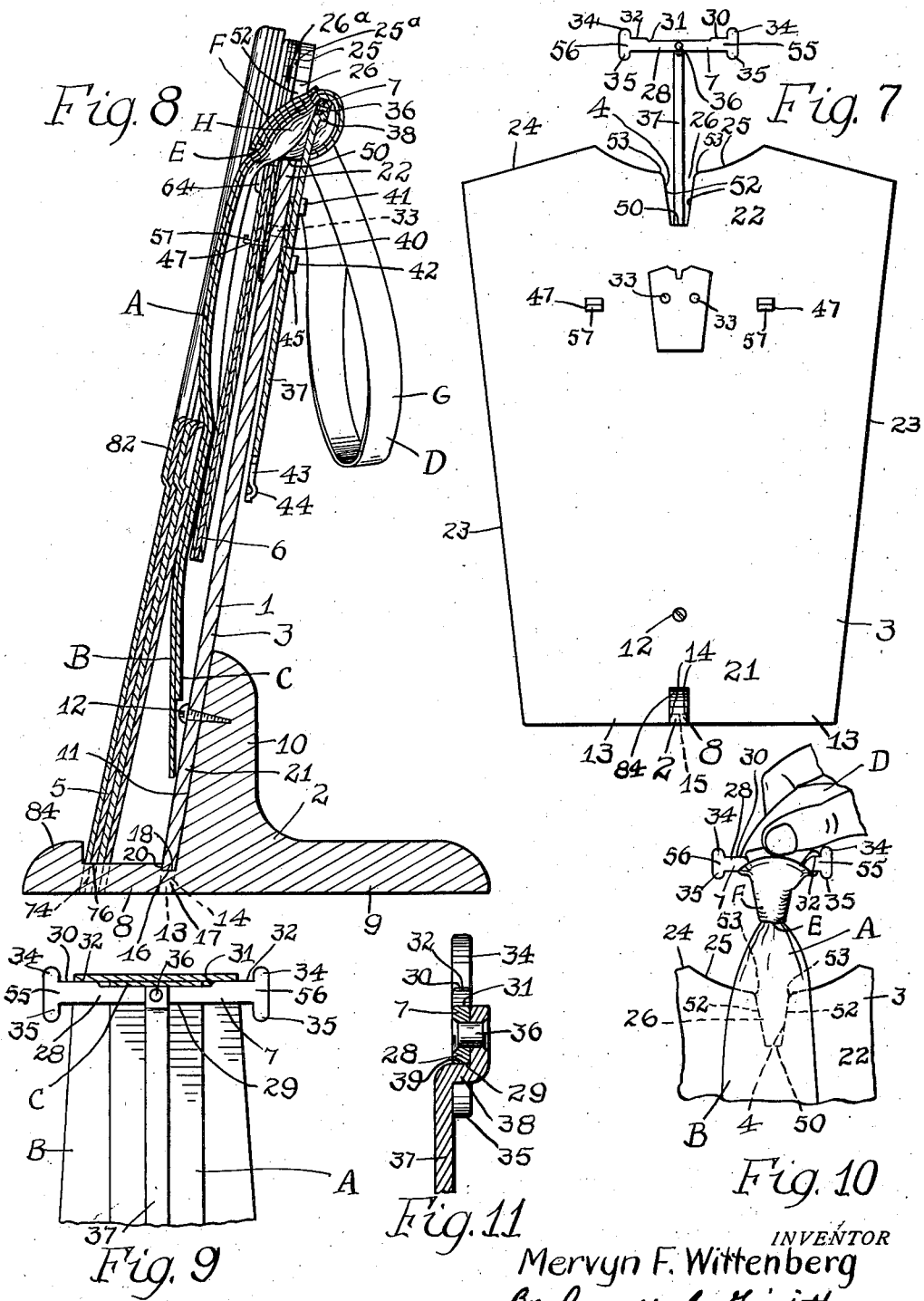
INVENTOR
Mervyn F. Wittenberg
By Russell B. Griffith
his Attorney Feb. 8, 1938. M. F. WITTENBERG 2,107,356
DISPLAY DEVICE FOR WEARING APPAREL
Filed March 12, 1934 4 Sheets-Sheet 3
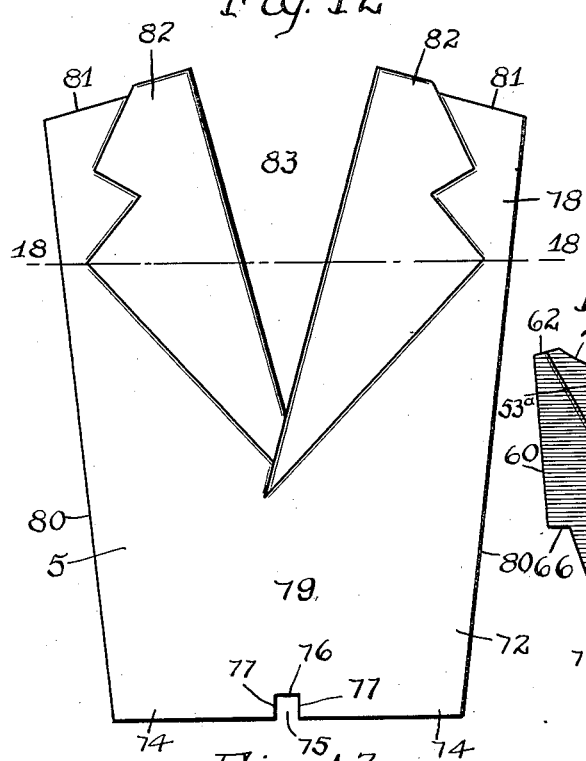
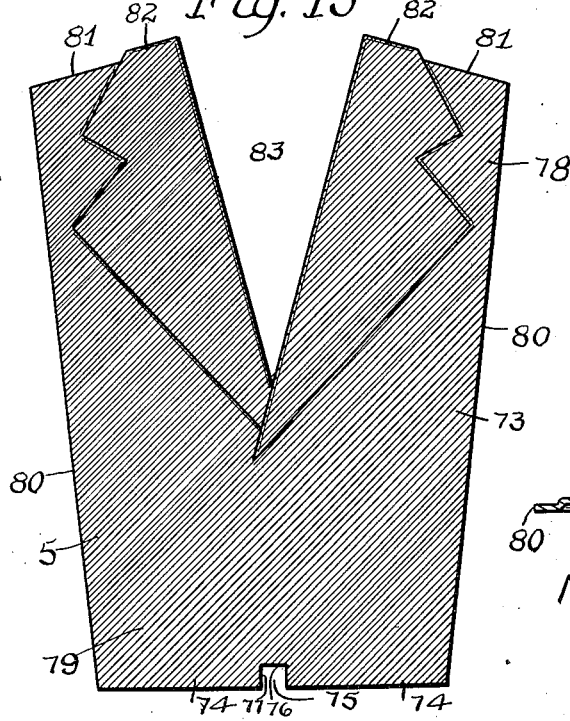
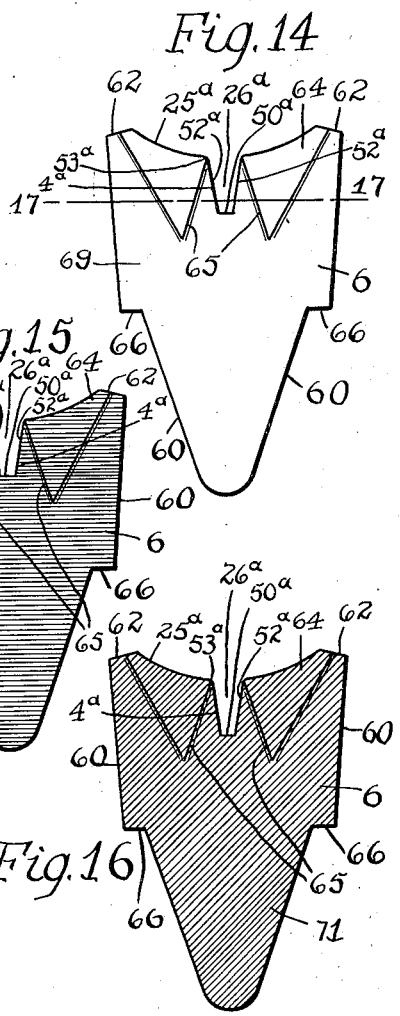
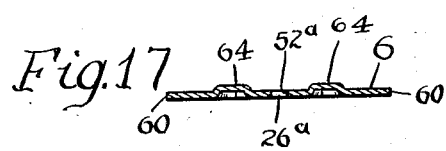
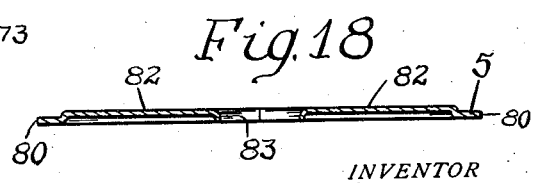
INVENTOR
Mervyn F. Wittenberg
by Russell B. Griffith
his Attorney

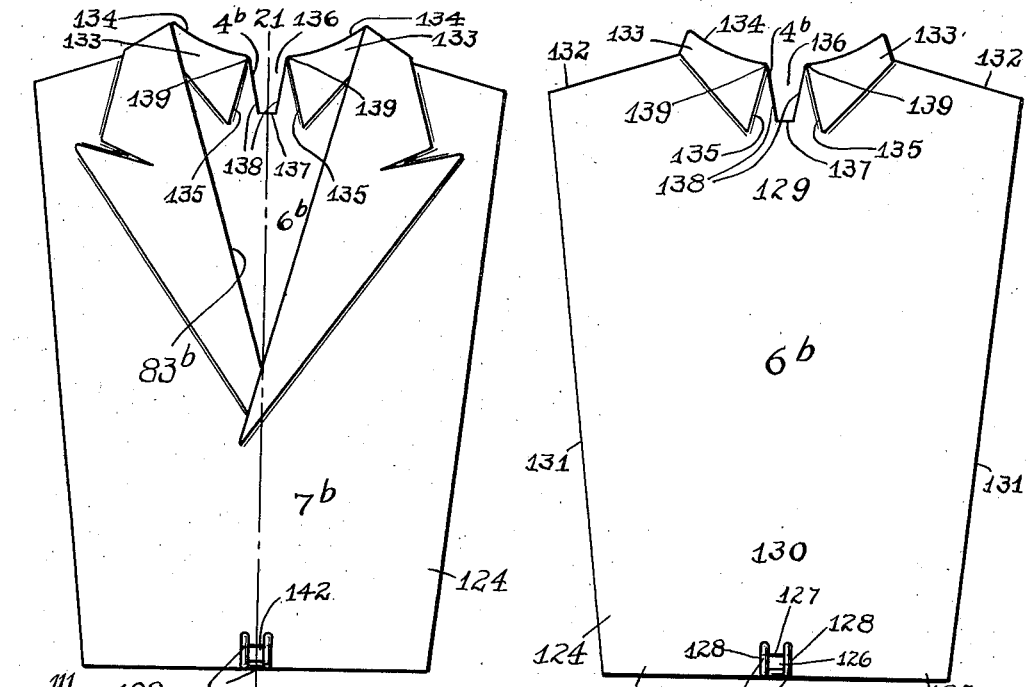
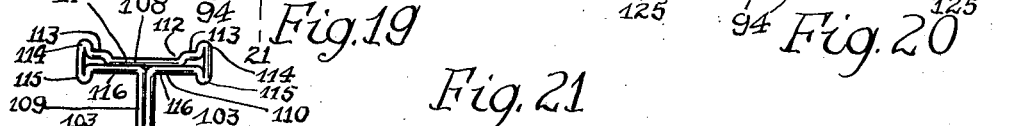
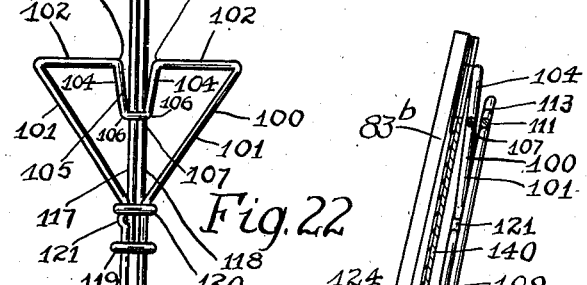
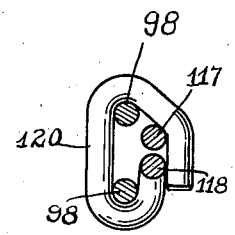
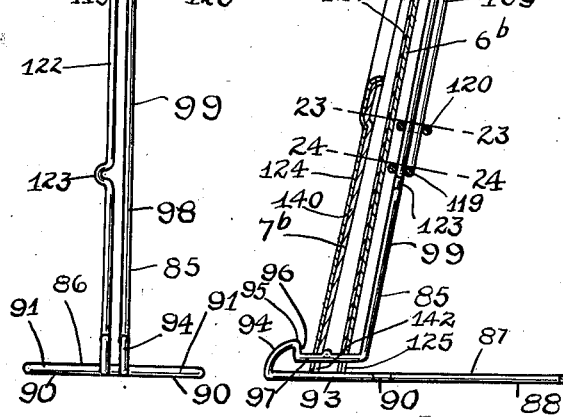
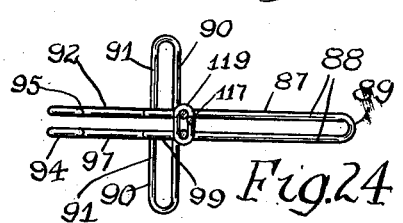

Patented Feb. 8, 1938

2,107,356

UNITED STATES PATENT OFFICE 2,107,356

DISPLAY DEVICE FOR WEARING APPAREL

Mervyn F. Wittenberg, Rochester, N. Y.

Application March 12, 1934, Serial No. 715,114

11 Claims. (Cl. 35—56)

The present invention relates to display apparatus and more particularly to a device for displaying neckwear and it has for its object to provide an attractive, light, and efficient device, simple to operate and which will effectively display neckties or the like as they would appear when worn.

My invention contemplates demonstrating to would be purchasers the contrasts that occur between the neckwear on the one hand and diversified shirts and outer clothing on the other, with respect to color combinations, so that with the apparatus provided, an idea may be gained in advance of how effective the necktie will be when worn with different combinations of these other articles of clothing or vice versa. The improvements relate in fact to the neckwear supporting devices, the shirt and other clothing representations and to arrangements provided for manipulating them in connection with each other.

In the drawings:

Fig. 7 is a front view of the standard with the suit and shirt units removed.

Fig. 8 is a section on the line 8—8, Fig. 1.

Fig. 9 is a fragmentary detail view of the tie supporting element with a transverse section of a tie showing how the narrow end of the tie rests in the recess in the tie supporting element.

Fig. 10 is a detail view illustrating how the tie is mounted and held on the tie supporting element prior to moving the knot into the knot shaping and holding means.

Fig. 11 is a fragmentary detail vertical section through the tie supporting element and the guide bar.

Figs. 12 and 13 are white and brown suit units, respectively.

Figs. 14, 15 and 16 are white, blue and brown shirt units, respectively.

Fig. 17 is a section on the line 17—17, Fig. 14.

Fig. 18 is a section on the line 18—18, Fig. 12.

Fig. 19 is a front view of a modification of the invention with the conventional coat front unit.

Fig. 20 is a front view of the modification with the coat unit removed and showing the full length shirt unit.

Fig. 21 is a vertical section on the line 21—21, Fig. 19.

Fig. 22 is a view of the standard with the shirt and coat units removed.

Fig. 23 is a horizontal section on the line 23—23, Fig. 22.

Fig. 24 is a detail sectional view on the line 24—24, Fig. 22.

Figure 1:
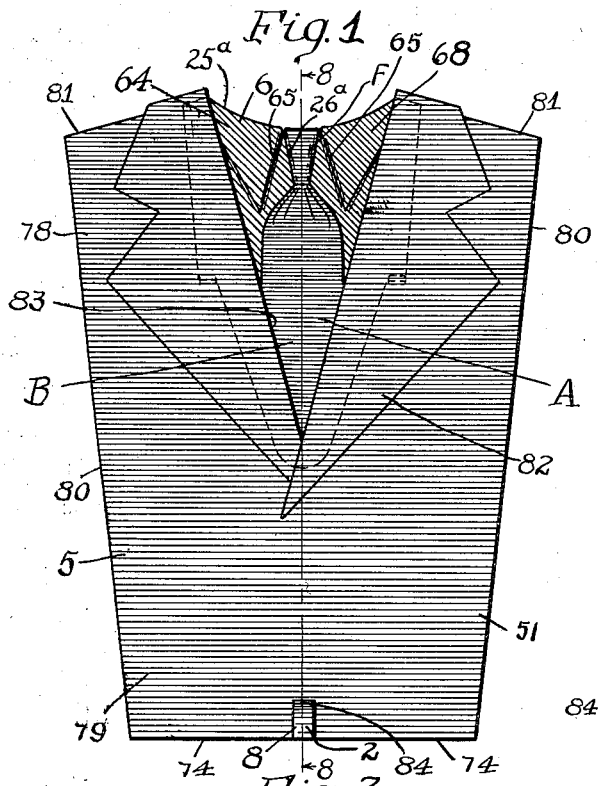
Fig. 1 is a front view of the invention showing a necktie being displayed with a shirt and suit unit.
Figure 2:
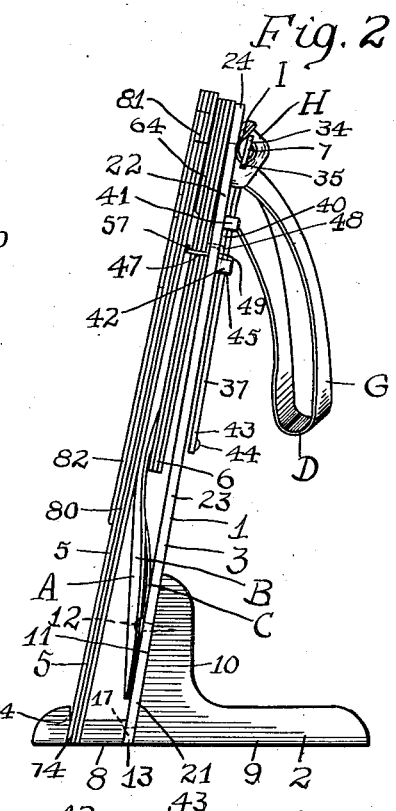
Fig. 2 is a side view of the device.

Referring more particularly to the drawings, a convenient embodiment of this invention is illustrated in Figs. 1 to 18 and has, as shown in Figs. 1, 2, and 8, a body element 1 comprising a base 2 and an upright 3, said upright 3 being provided with a knot shaping and holding element 4, and serving to support a plurality of suit units 5, a plurality of shirt units 6, and a tie supporting element 7. A tie being displayed is designated as A, and has a wide end B, a narrow end C, and an intermediate portion D.

The base 2 has a forwardly projecting foot 8 and a rearwardly projecting foot 9, said rearwardly projecting foot being provided with a brace 10 having a slanting wall 11 to which the upright 3 is secured by a screw 12 in a vertical, slanting position, as shown in Fig. 8.

Extending from the lower edge 21 of the upright and supporting the body element laterally, are two short legs 13 spaced apart by a recess 15 which has vertical walls 14 and a top wall 16. This recess receives an intermediate notched portion 17 of the base 2 and provides an interlocking joint between the base and the upright, and permits a knock down structure which can be readily assembled or taken apart and shipped compactly. The intermediate notched portion 17 has a top wall 18 connected at its rear end by the wall 11 of the brace and at the front end by a vertically extending wall 20.

The upright 3, in this instance, is uniformly flared from the lower end 21 toward the upper end 22, and is outlined by side walls 23 diverging upwardly from the legs 13, and connected at their upper ends by a top wall 24 which has an intermediate concaved curved portion 25.

The knot shaping and holding element is an integral part of the supporting upright, in this embodiment of the invention, and comprises a recess 26 bisecting the curved wall 25. This recess has a bottom wall 50 which serves to maintain the lower edges E of the fold of the tie A forming the knot simulation F in the same horizontal plane. It also has two side walls 52 which, in this instance, diverge upwardly and engage the sides of the knot F to hold the folds against coming loose and to shape the knot. Connecting the ends of the side walls with the curved top wall 25 are two convex curved walls 53 which serve to guide the knot F into the knot shaping and holding element.

Supported on the upright 3, in cooperative relation to the knot shaping and holding element 26, is the horizontally arranged tie supporting element 7, which, in this instance, comprises a bar 28 having a lower wall 29 and an upper wall 30, said upper wall being provided with a recess 31 for receiving the underfold C of a tie A, as shown in Fig. 9. Projecting outwardly from the opposite ends of the bar 28 and in opposite directions, are two pairs of lugs 34 and 35. These lugs prevent the tie slipping off the bar 28, particularly while it is being mounted for display.

In order that the tie supporting element 26 may be moved vertically and horizontally, it is secured by a rivet 36 to the upper end of a flexible guide bar 37 which is provided with a step 38 having a shoulder 39 engaging the lower wall 29 of the bar 28 to prevent said bar 28 turning on the guide bar 37. The flexible guide bar 37 is vertically slidable on a guide plate 40 and passes loosely through two resilient channel guides 41 and 42 formed up from and arranged at the opposite ends of the guide plate 40. The guide plate 40 is secured by rivets 33 to the rear side of the upright below the knot shaping and holding element and is arranged so the guide bar follows a path that intersects the space immediately behind the knot holding and shaping element, so that a knot projecting forward from and supported by the tie supporting element may be readily moved into the knot shaping and holding element.

Figures 4, 5, 6:
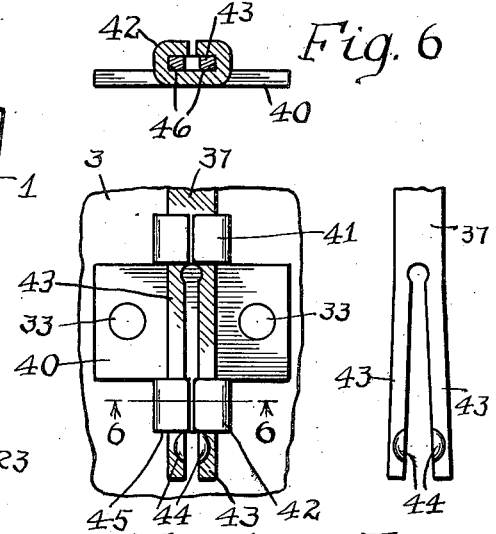
Fig. 4 is a detail view of the lower end of the tie support guide bar showing how the spring arms are normally spread apart.
Fig. 5 is another detail view of the tie support guide bar showing how the spring arms are compressed by the guideway when the tie support is in its uppermost position.
Fig. 6 is a section on the line 6—6, Fig. 5.

When mounting a tie on the tie supporting element, it is desirable that the tie supporting element remain, of its own accord, in its uppermost position. After the tie is mounted on the tie supporting element, as shown in Fig. 10, and is ready to be moved into the knot holding and shaping element, it is also desirable that the tie supporting element may be readily released and moved downwardly from its uppermost position. To this end there is provided, at the lower end of the guide bar, two spring arms 43, each having an embossed stop 44 for engaging the lower walls 45 of the channel guide 41 to prevent the end of said guide bar slipping through the guides. In order that the guide bar remains in its uppermost position of its own accord, the spring arms 43 are normally spread apart, as shown in Fig. 4, so that when the guide bar is in its uppermost position they are compressed in the channel guide, as shown in Figs. 5 and 6, and bind with the inner walls 46 of the channel guide 41.

In mounting a tie A for display, it is best accomplished by folding it end to end so that both ends B and C are substantially of equal length, and so that the narrow end C lies behind the wide end B, and that the intermediate portion D is looped as at G. The tie supporting element is raised to its uppermost position, where it remains of its own accord, as previously stated, and the folded tie A is draped over the tie supporting element so that the free ends lie over the face of the tie shaping and holding element, and also that the length of the depending folds are substantially the same as the length of the depending folds of a tie worn by a person.

When the tie is draped over the tie supporting element, the narrow end C is received in the recess 31 in the tie supporting element, as shown in Fig. 9, and the wide end B rests over the narrow end and extends over the shoulders 32 on each side of the recess 31, and both the free ends of the tie depend downwardly on the face side of the upright.

In the next step the intermediate looped portion E is passed forwardly from its position behind the tie supporting element, under one of the laterally extending arms 55 of the tie supporting element and around the front of the tie and then rearwardly under the other latterly extending arm 56, thus making a loop over and around the face of the tie. While the loop is being formed, the tie is prevented from slipping off the tie supporting elements by the ears 34 and 35 projecting from the opposite ends of said tie supporting element. After the intermediate section D is looped over the face of the tie, it is drawn up and held by hand, as shown in Fig. 10, into a simulation of a knot F, and is ready to be held and shaped by the knot shaping and holding element. The tie and knot may be adjusted, if necessary, and the tie supporting element is moved downwardly until the knot is in the knot shaping and holding element where it is shaped and held.

Forming the knot of the tie in the above manner creates of it a spring body H which, due to that peculiar quality of cloth exerts, when distorted, a constant expansive pressure in its effort to straighten out. This expansive pressure may be effectively utilized in the present embodiment of the invention by drawing up the knot prior to insertion, until it is slightly smaller than the knot holding and shaping recess 26, and then inserting said knot therein so that it may expand to and frictionally engage the side walls of the recess 26 where it is shaped and held. However, it may not always be convenient to draw up the knot and in instances of this kind, the diverging walls of the recess gradually compress the sides of the knot as it is moved into position. In either event, the expansive pressure on the knot frictionally holds the transverse folds from slipping loose.

Figure 3:
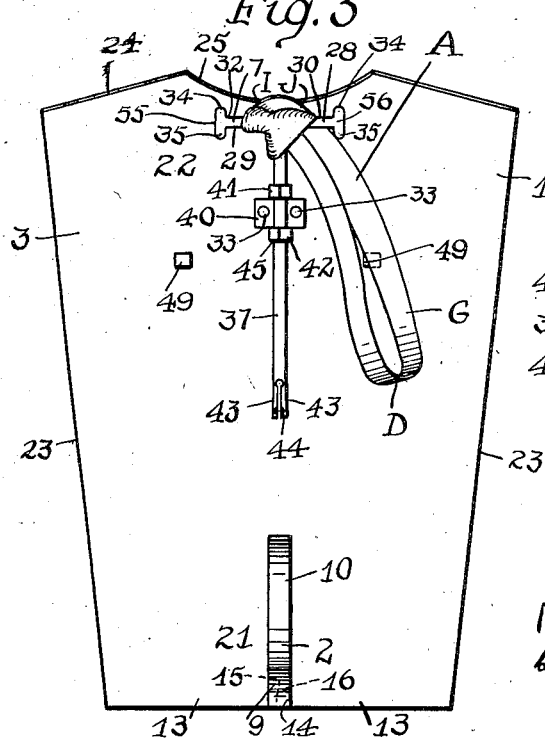
Fig. 3 is a rear view.

To further insure the knot against slipping, the folds I and J extending immediately from the transversely encircling section are resiliently clamped between the tie supporting element and the rear face of the tie shaping and holding element, as shown in Fig. 3.

To effectively display a tie arranged in the knot shaping and holding element, with color contrasts, the front face of the upright of the body element is decorated in this embodiment of the invention to simulate either a shirt, a coat, or both garments in their proper relative positions when worn by a person.

Of course, in certain aspects of my invention, the body element 1 might, of itself, be decorated to represent a shirt, a coat, or both, but in the present embodiment I provide these separately in interchangeable relationship thereto.

I find it convenient to form the shirt units 6 of a light, stiff sheet material, such as fiberboard, colored on one face thereof in any convenient manner. In this modification of the invention the base element has been colored and each shirt unit has a different facing of a popular colored and styled shirt, as a green shirt 68, shown in Fig. 1, a white shirt 69, shown in Fig. 14, a blue shirt 70, shown in Fig. 15, and a brown shirt 71, shown in Fig. 16.

The shirt units 6 are arranged in stacked relation on the face of the upright and the outermost one forms a background for the tie, as shown in Fig. 1. In this instance, each shirt unit is V shaped and has two upwardly diverging sides 60 connected at their upper ends by two inwardly directed shoulders 62. The inner ends of these shoulders 62 are joined by a concave curved side 25a which forms the upper edge of a collar 64 embossed on the shirt unit. Between the ends 65 of the embossed collar 64 and bisecting the curved wall 25a there is provided a knot shaping and holding element 4a which registers and cooperates with the knot shaping and holding element on the upright, comprising a recess 26a bisecting the curved side 25a and having a bottom wall 50a, two upwardly diverging side walls 52a and two convex curved walls 53a connecting the side walls 52a with the upper curved side 25a of the unit. The area of the shirt unit is slightly larger than the V opening between the lapels of a real coat. The curved top side 26a and the knot shaping and holding element 4a bisecting it register with their counterparts on the upright with one exception, and that is that the recess 26a is slightly deeper than the recess 26, to permit the removal of the shirt units without disturbing the knot.

To the end of supporting the shirt units so that they may be removed and changed without disturbing a tie in display position, each side 60 has a shoulder 66 which rests on arms 47 projecting from the face side of the upright and having portions 48 passing therethrough and turned down at 49, said arms being spaced apart to accommodate the width of the unit between the shoulders. The ends of each of said arms 47 are turned upwardly to form short stops 57 to prevent the shoulders slipping off. To remove a unit without disturbing a tie in display position, said unit is raised vertically high enough to permit the shoulders 66 to pass over the stops 48 and then withdrawn from the standard. By reason of having the recess 26a deeper than the recess 26, the lower wall 50 does not engage and disturb the knot of the tie in display position on the upright. A number of shirt units may be supported by the arms 47 at the same time, as shown in Fig. 2, and when this is the case, one lies behind the other and the knot F of the tie A is received in the recess 26a in each of the units, as shown in Fig. 8, and the depending folds B and C lie in front of the shirt units.

I find it convenient also to form the base element of the coat units 7 of a light, stiff, sheet material, such as fiberboard and colored in any convenient manner on the display face thereof. Each coat unit has a different facing of a popular colored and styled coat, as a blue coat 61, shown in Fig. 1, a white coat 72, shown in Fig. 12, and a brown coat 73, shown in Fig. 13.

The coat units, like the shirt units, are removable and interchangeable, and are arranged on the face of the upright and form a frame for the tie and a portion of the shirt, as shown in Fig. 1.

Each of the coat units 5 has the general outline of the upright and is supported laterally by two legs 74 spaced apart by a guide recess 75 having a top wall 76 and side walls 77. The upper end 78 of the coat unit is wider than the lower end 79 and the sides 80 diverge upwardly from the legs and are joined at their upper ends by shoulders 81. Intersecting the shoulders and projecting above them are the ends of two embossed coat lapels 82. The section between the inner edges of the coat lapels 82 is cut away to provide a window 83 through which may be seen those portions of a tie and shirt which are usually exposed when worn.

The coat units rest in stacked relation on the upright in a slanting vertical position, as shown in Fig. 8, and are held in position by the forwardly extending foot 8 over which the legs 74 straddle. The guide recess 75 is slightly larger than the cross section of the forwardly extending foot 8, thus providing limited lateral movement of the coat units and permitting the easy removal and replacement of the units into positional relation with the other parts. A stop 84 is provided on the end of the foot 8 and prevents the coat units slipping off the end.

In the modified form of the invention, as shown in Figs. 19 to 24, the body element 85 is formed of a continuous piece of wire. The base 86 is provided with a rearwardly extending foot 87 comprising two parallel sections 88 connected at their outer ends by a loop 89 and joined at their inner ends by two oppositely, laterally extending U shaped feet 90. The front section 91 of each of the U feet 90 is connected to the forwardly extending foot 92 and comprises two parallel sections 93. The ends of each of the sections 93 have two vertically and rearwardly extending curved sections 94 which are connected at their inner ends 95 by two downwardly extending sections forming stops 96. Connecting these sections 96 and extending rearwardly therefrom are two sections forming guides 97, spaced from the foot 92 and connected at their rear ends by two vertically slanting, parallel sections 98 forming the upright 99.

Supported on the upper ends of the upright is a triangular head 100 having two diverging side sections 101 and two inwardly directed horizontal sections 102 connected at their curved inner ends 103 by upwardly diverging side sections 104 of the knot shaping and holding element 105. The lower ends 106 of the sections 104 are connected by a horizontal bottom section 107.

The tie supporting element 108 is formed of a single strip of wire 109 in the general shape of a T, and has at its uppermost end a cross-head 110 which is provided with an upper section 111 shaped to form a recess 112 for the underfold of a tie, and two shoulders 113. Extending upwardly from opposite ends of the shoulders 113 are two upwardly extending ears 114 which connect with two downwardly extending ears 115. These ears 115 in turn are connected with two inwardly directed sections 116 which are joined at their inner ends by a pair of vertical sections 117 and 118, the section 117 being longer than the section 118.

In order that the tie supporting element may be slidable on the upright, the section 117 has an oval ring 119 loosely encompassing the vertical sections 98 of the upright. The lower end of the section 118 also has an oval ring 120 loosely encompassing the vertical sections 98 of the upright and also the vertical section 117 of the tie supporting element, as shown in Fig. 22.

The tie supporting element is held in its uppermost position by a cam stop 121 formed on the upper end of the section 122 and cooperating with the ring 120. As the ring 120 passes upwardly it engages the cam stop 121 and springs the section 122 inwardly and then passes over the cam stop 121 whereupon the section 122 springs back again and the ring rests above and on said cam stop 121, thus holding the tie supporting element in its uppermost position.

To move the tie supporting element downwardly, sufficient downward pressure must be exerted on the tie supporting element to ride the ring over the cam stop against the spring action of the section 122 and flex said spring section inwardly so that the ring may pass over the cam stop 121 and permit said tie supporting element to be lowered. As it is desirable to prevent the horizontal cross-head 110 of the tie supporting element dropping below the knot shaping and holding element, a stop 123 is provided on the section 122 cooperating with the ring 119 to support the tie supporting element in its lowered position.

In mounting a tie for display the same steps may be followed in this form of the invention as were followed in the first form. The tie supporting element is first raised to its uppermost position and then the tie is folded lengthwise and draped over the tie supporting element so that the depending folds lie over the face of the knot shaping and holding element. Then the loop is made around the front of the tie to form the knot, and it is drawn up, adjusted and moved into the knot shaping and holding element where it is held in display position.

A tie thus supported is displayed with color contrasts in a similar manner to that described in the first embodiment of this invention. The body element 85 is decorated to simulate a shirt, a coat or both garments in their proper relative positions. In this embodiment of the invention these decorations are provided separately in interchangeable relationship to the body element.

The decorations comprise, in this instance, one or more removable and interchangeable shirt and/or suit units 6$^b$ and 7$^b$, respectively, and although only one of each is shown in the drawings, it is obvious from the construction of the body element and the foregoing explanation that more than one of each may be employed and supported in stacked relation on the body element, the suit units normally being in front of the shirt units and the outermost shirt and suit units forming the background for a tie to be displayed. Each unit may have a base element 140 of light, stiff sheet material such as fiberboard and may be covered on one side with a garment material 124 or the representation thereof, and the color, material and the style of garment represented may be different on each unit to produce desired garment contrasts.

In certain aspects of my invention, I contemplate decorating both sides of each shirt and/or coat unit to represent the different garments.

Each shirt unit is of substantially the same size as a coat unit 7, described in the first form of this invention, and is supported laterally by two legs 125 spaced apart by a guide recess 126 having a top wall 127 and side walls 128. The upper end 129 of each unit is wider than the lower end 130 and the sides 131 diverge upwardly from the legs and are joined at the top by shoulders 132.

Projecting above the shoulders 132 are portions of a collar 133 embossed from the plane of the material, and provided with a concaved upper edge 134. Arranged between the collar points 135 and bisecting the curved edge 134, is the knot shaping and holding element 4$^b$. The knot shaping and holding element 4$^b$ cooperates with the knot shaping and holding element 4$^a$ on the body element in maintaining a folded tie in simulation of a knot, in a like manner to that described for the similar parts in the first form of this invention, and comprises a recess 136 having a bottom wall 137, two upwardly diverging side walls 138 and two convex curved walls 139.

When arranged on the body element, each shirt unit stands on its legs 125 and rests in a slanting vertical position against the upright, so that the knot shaping and holding recess 4$^b$ registers with the recess 4$^a$ on said upright and the legs 125 straddle the guide 97.

In contour and size each coat unit 7$^b$ is identical with the unit 7 described in the first form of this invention and is also provided with a window 83$^b$. When arranged on the body element as shown in Figs. 19 and 21 it is normally in front of the shirt units and is supported by the upright in a slanting vertical position on legs 141 which are spaced apart by a guide recess 142. This guide recess cooperates with the guide 97 to maintain said unit in positional relationship with the other parts. The stop 96 on the end of the guide 97 prevents the unit slipping off the end.

In the operation, it will be assumed that the display device is standing on a counter in a store, next to a tie rack, as a dummy display to show off some popular designed tie with a certain color scheme such as a blue coat, a green shirt and a blue tie, as shown in Fig. 1.

A customer might approach a salesperson and tell him that he wishes to purchase a tie for a person who usually wears a brown suit and a tan shirt. The salesperson will immediately change the suit and shirt units to the given color combination and remove the tie being displayed and select a number of ties and mount them successively on the display device until a selection is made. It is possible that the customer might desire to see how the selected tie appears with other color combinations, and if this should be the case, the tie need not be disturbed when the shirt or coat units are changed to the desired combinations. In each case the color combination is quickly made and the selected tie is quickly mounted for display so that the customer's interest does not wane while the changes are being made.

On some occasions it is desirable to display a tie on a shirt unit with the coat unit removed. The shirt units illustrated in the second form of this invention are very suitably adapted for this purpose as they offer a large area for color contrasts, and may also be interchanged without disturbing a tie being displayed.

In most cases, ties are purchased to match definite color combinations in clothing and the purchase is usually made for someone who is not present. A great deal of difficulty is encountered for the average customers to visualize how a chosen tie will look with the certain color combination. Poor selections are made and much of the time of the salesperson is lost in assisting in making a selection. Sales are lost because customers become impatient for lack of time and other reasons. Occasions arise where a person is purchasing a tie for himself but at the time of the purchase is not wearing the color combination for which he is selecting the tie. There are still other occasions where the customer is wearing the proper color combination but will make a selection quicker if afforded the opportunity of seeing, at a perspective, the knotted tie with the color combination he is wearing. The present invention obviates the difficulties mentioned above.

From the foregoing it will be clearly seen that by this invention there is provided an effective and simple device for displaying neckwear and outer garments in connection therewith, readily adaptable to the clothing trade.

What I claim is:

1. A display device of the character described embodying in combination a body element simulating a body garment and provided with a necktie shaping means embodying two upwardly diverging walls and a horizontal wall connecting the lower ends thereof, of a necktie support about which a necktie may be folded and movable relatively to the body element to bring a tie so supported into cooperation with the shaping means to simulate a knot.

2. A display device of the character described embodying in combination a body element simulating a body garment and provided with a necktie shaping means, of a necktie support about which a necktie may be folded and movable relatively to the body element to bring a tie so supported into cooperation with the shaping means, to simulate a knot, and means for releasably maintaining the support in a predetermined position in its path of movement.

3. In a display device of the character set forth, the combination with a support simulating an outer body garment and having a portion indicating the usual position of a necktie with reference thereto, of a holder for supporting such tie movable relatively to the support to bring such tie when folded thereon into proper lateral cooperation with such support to give the effect of a knotted tie in the usual relationship to such outer garment.

4. In a display device of the character described, the combination with a body member and interchangeable elements mounted thereon to simulate articles of outer clothing, said elements and the body member being provided with cooperating devices to properly position said elements with relation to each other, of a holder for an article of neckwear mounted on the body member and relatively movable with reference to the said elements between an inoperative withdrawn position in which the neckwear is applied and a relationship to the body member that will give it a costuming appearance.

5. A mechanical display device of the character described embodying in combination two elements, an upper support about which a necktie may be folded to simulate a knot and a lower support which reacts against the first to pinch the tie thereon and maintain such simulation.

6. A mechanical display device of the character described embodying in combination two elements, an upper support about which a necktie may be folded to simulate a knot and a lower support which reacts against the first to pinch the tie thereon and maintain such simulation, the upper support being slidably connected by means of guides to the lower support.

7. A mechanical display device of the character described embodying in combination two elements, an upper support about which a necktie may be folded to simulate a knot and a lower support which reacts against the first to pinch the tie thereon and maintain such simulation, the upper support being slidably connected by means of guides to the lower support and obscured thereby when the tie is so held between them.

8. In a mechanical display device of the character described, the combination with a forked lower support having a substantially V-shaped wedging fork in the upper portion thereof, of an upper support adapted to receive and hold an unknotted necktie in simulation of a knot, said upper support being movably mounted on the lower support to carry the simulated knot into the fork and the fork being adapted to engage it laterally and maintain it in the desired form.

9. In a mechanical display device of the character described, the combination with an upper support embodying a cross bar and a depending stem about which support a necktie may be wrapped to simulate a knot, of a lower support provided with a guide to receive the stem of the upper support and having horizontally spaced pinching abutments between which the tie may be wedged by the relative movement of the supports to maintain the simulation.

10. A display device of the character described, embodying a body element simulating the upper portion of a man's shirt and provided at its top with a notch-like portion constituting a necktie engaging and shaping means, a necktie support embodying a vertical rod about which a necktie may be folded in simulation of a knot mounted on and movable relatively to the body element to bring the knot simulating portion of the tie so supported downwardly in lateral cooperation with the shaping means to maintain the simulation of a knot, and an element simulating a shirt covering article of men's outer clothing and provided with an open end in the region of the knot, said element being arranged in front of and supported by and detachably secured closely adjacent to said body element.

11. A display device of the character described embodying in combination a body element simulating a body garment and provided with a notch-like portion constituting a necktie shaping means at its top, a necktie support about which a necktie may be folded provided with two spaced stops cooperating with the body element to hold the support, selectively, in operative and inoperative positions, and movable vertically relatively to the body element to bring the knot simulating portion of the tie so supported downwardly in lateral cooperation with the shaping means to simulate a knot.

MERVYN F. WITTENBERG.